United States Patent
Cai et al.

(10) Patent No.: US 11,951,647 B2
(45) Date of Patent: Apr. 9, 2024

(54) NODE DIAPHRAGM SCRAPING AND SORTING DEVICE FOR BAMBOO SPLIT

(71) Applicants: Nanjing Forestry University, Nanjing (CN); JM Industries Group, Fuyang (CN); Fujian Shuangyi Bamboo and Wood Development Co., Ltd., Jian'ou (CN)

(72) Inventors: Jiabin Cai, Nanjing (CN); Shuai Cao, Nanjing (CN); Minghan Li, Nanjing (CN); Nan Zhou, Fuyang (CN); Chang Liu, Nanjing (CN); Pengyu Wang, Nanjing (CN)

(73) Assignees: Nanjing Forestry University, Nanjing (CN); JM Industries Group, Fuyang (CN); Fujian Shuangyi Bamboo and Wood Development Co Ltd, Jian'ou (CN)

( * ) Notice: Subject to any disclaimer, the term of this patent is extended or adjusted under 35 U.S.C. 154(b) by 0 days.

(21) Appl. No.: 17/965,429

(22) Filed: Oct. 13, 2022

(65) Prior Publication Data
US 2023/0119588 A1 Apr. 20, 2023

(30) Foreign Application Priority Data
Oct. 14, 2021 (CN) .......................... 202111198652.7

(51) Int. Cl.
*B27J 1/00* (2006.01)
(52) U.S. Cl.
CPC ....................... *B27J 1/00* (2013.01)
(58) Field of Classification Search
CPC ................... B27J 1/00; B27J 3/00; B27J 7/00

USPC ........................................................ 144/333
See application file for complete search history.

(56) References Cited

FOREIGN PATENT DOCUMENTS

| CN | 2600232 Y | * | 1/2004 | |
|---|---|---|---|---|
| CN | 101062568 A | * | 10/2007 | |
| CN | 201760936 U | * | 3/2011 | |
| CN | 104772808 A | * | 7/2015 | ............... B27J 1/00 |
| CN | 204869156 U | * | 12/2015 | |
| CN | 106738103 A | * | 5/2017 | |
| CN | 107160506 A | * | 9/2017 | ............... B27J 1/00 |
| CN | 108422509 A | * | 8/2018 | |
| CN | 109230426 A | * | 1/2019 | ..... B65G 2201/0282 |

(Continued)

*Primary Examiner* — Adam J Eiseman
*Assistant Examiner* — Jared O Brown
(74) *Attorney, Agent, or Firm* — CAHN & SAMUELS LLP

(57) ABSTRACT

Provided is a node diaphragm scraping and sorting device for a bamboo split, which is configured to scrape node diaphragms of the bamboo splits and to sequentially sort the bamboo inner layers and bamboo outer layers of the bamboo splits towards the same direction. The device includes a scraping device, a sorting device and a clamping and conveying device which are arranged from front to back along an axis. The scraping device includes a conical cylinder, two pressing semi-rings, and a scraping ring. The sorting device includes an e-shaped sleeve composed of an inner cylinder and an outer cylinder, and two shifting forks located at both ends of the sleeve. The clamping and conveying device includes an inner ring moving on the axis, two clamping semi-rings and a conveying power device. The structure, function and technical parameters of each branch device are also introduced in detail.

8 Claims, 13 Drawing Sheets

(56) References Cited

FOREIGN PATENT DOCUMENTS

| | | | | | |
|---|---|---|---|---|---|
| CN | 112621941 A | * | 4/2021 | ................ | B27J 1/00 |
| CN | 214265969 U | * | 9/2021 | ................ | B27J 1/00 |

* cited by examiner

NODE DIAPHRAGM SCRAPING AND SORTING DEVICE FOR BAMBOO SPLIT

CROSS-REFERENCE TO RELATED APPLICATION

This patent application claims the benefit of and priority to Chinese Patent Application No. 202111198652.7, filed with the China National Intellectual Property Administration on Oct. 14, 2021, the disclosure of which is incorporated by reference herein in its entirety as part of the present application.

TECHNICAL FIELD

The present disclosure relates to bamboo machining equipment, in particular the invention relates to a node diaphragm scraping and sorting device for a bamboo split, which is configured to scrape node diaphragms of bamboo splits obtained by splitting raw bamboo and to sort bamboo outer layers or bamboo inner layers of the bamboo splits towards the same direction.

BACKGROUND

During the machining of bamboo laminated lumber, raw bamboos need to be split into bamboo splits with several width specifications, then the bamboo splits are sliced into bamboo strips, and as the bamboo outer layers and the bamboo inner layers of the bamboo splits are unusable parts in production, they need to be removed using the planer. The planer can efficiently slice and remove the bamboo outer layer and the bamboo inner layer at one time only when the bamboo outer layer and the bamboo inner layer correspond to different cutters, respectively. Therefore, the sliced bamboo splits need to be fed into the planer one by one for machining after being arranged in the sequence that the bamboo outer layers or the bamboo inner layers face the same direction.

At present, as the bamboo outer layers or the bamboo inner layers cannot be arranged upwards or downwards in sequence in the bamboo laminated lumber machining enterprises in China, when the bamboo splits are machined by the planer, many operators are required to feed the bamboo splits to the planer while selecting the inner layer or the outer layer, resulting in the great increase in the number of the operators. Moreover, due to the fact that many fiber burrs on the bamboo splits and the untidy bamboo node diaphragms on the bamboo inner layer often stab the operators, the risk of getting injured for the operator is increased. Therefore, it is very important to firstly arrange the bamboo splits machined by the planer in the sequence that the bamboo inner layers or the bamboo outer layers face the same direction.

SUMMARY

An objective of the present disclosure is to provide a node diaphragm scraping and sorting device for a bamboo split, which can sort bamboo outer layers and bamboo inner layers of bamboo splits in a sequence towards the same direction while scraping node diaphragms of the bamboo splits.

To achieve the objective, the technical solution employed by the present disclosure is as follows:

The node diaphragm scraping and sorting device comprises a scraping device, a sorting device, and a clamping and conveying device arranged between the scraping device and the sorting device, or in front of the sorting device. The scraping device and the sorting device are arranged from front to back along an axis.

The scraping device comprises a conical cylinder with a small rear part and a large front part, at least two pressing semi-rings are arranged in a circumferential direction of the conical cylinder and are connected to a pressing power device which drives the pressing semi-rings to move in a radial direction of the conical cylinder, and a scraping ring is arranged on a periphery of a large end of the conical cylinder.

The pressing semi-rings, under the driving of a pressing power device, is configured to press the bamboo split, which passes through the position between the conical cylinder and the pressing semi-rings, on the scraping ring.

The sorting device comprises a sleeve and two shifting forks located at both ends of the sleeve; the sleeve is e-shaped and is provided with an inner cylinder and an outer cylinder to form a double-layer structure; a clearance t between the inner cylinder and the outer cylinder satisfies: h<t<2h, and h is the thickness of the bamboo split. The shifting forks each comprise a plurality of shifting rods extending in a radial direction of the sleeve; the two shifting forks are connected to a shifting fork driving device which drives the shifting forks to rotate around the axis and is located inside the sleeve; and a transverse outlet is formed between a side edge of the inner cylinder and a side edge of the outer cylinder which are far away from the axis.

When the bamboo split penetrates through the clearance between the inner cylinder and the outer cylinder in an axial direction, both ends of the bamboo split are located between two adjacent shifting rods of the two shifting forks, the shifting forks are rotated to push the bamboo split to move towards the transverse outlet along the clearance in the circumferential direction of the sleeve and to come out from the transverse outlet.

The clamping and conveying device is configured to clamp the bamboo split in a radial direction and convey the bamboo split in an axial direction. The clamping and conveying device comprises an inner ring moving on the axis; at least two clamping pressing rings are arranged in a circumferential direction of the inner ring and are connected to a clamping power device which drives the clamping pressing rings to move in a radial direction of the inner ring, and the clamping power device is connected to a conveying power device which drives the clamping power device to move in the axial direction.

The clamping semi-rings, under the driving of the clamping power device, are configured to clamp the bamboo split on the inner ring, and the conveying power device is configured to drive the clamping power device, the clamped bamboo split and the inner ring to move in the axial direction.

The node diaphragm scraping and sorting device for a bamboo split has the beneficial effects that, during the use of the device, the raw bamboo with the small-head end in front and the large-head end in rear moves from the back to the front in an axial direction under the pushing of an impact pushing device, and the raw bamboo is gradually split by a splitting cutter ring from the small-head end thereof, thus splitting the raw bamboo in the circumferential direction to form bamboo splits basically equal in width.

After the annularly arranged bamboo splits pass through the position between the conical cylinder and the pressing semi-rings, the pressing semi-rings, under the driving of the pressing power device, can press the bamboo split on the scraping ring, and the scraping ring is configured to scrape the node diaphragms on the bamboo split.

When the clamping and conveying device is in front of the sorting device, the raw bamboo is pushed by the power of the impact pushing device, after the annularly arranged bamboo splits moving forwards penetrate through the clearance between the inner cylinder and the outer cylinder of the sleeve, the front ends of the bamboo splits extend into the position between the inner ring and the clamping semi-rings. When the raw bamboo loses the power of the impact pushing device, the clamping semi-rings, under the driving of the clamping power device, are able to clamp the front ends of the bamboo splits between the inner ring and the clamping semi-rings. Afterwards, the conveying power device operates to drive the bamboo splits to move axially until the rear ends of the bamboo splits without node diaphragms come out of the scraping device. Both ends of the bamboo splits are located between two adjacent shifting rods on the two shifting forks. At the moment, the conveying power device can stop operating, the bamboo splits no longer move axially, and the clamping semi-rings loosen the bamboo splits.

When the clamping and conveying device is located between the scraping device and the sorting device, the bamboo splits extending out of the scraping device enter the position between the inner ring and the clamping semi-rings and then enter the clearance of the e-shaped sleeve. After the bamboo splits lose the power of the impact pushing device, the clamping semi-rings are driven by the clamping power device to clamp the bamboo splits between the inner ring and the clamping semi-rings. Afterwards, the conveying power device operates to drive the bamboo splits to move axially until the rear ends of the bamboo splits without the node diaphragms come out of the scraping device, and meanwhile, the front ends of the bamboo splits move forwards to penetrate through the clearance between the inner cylinder and the outer cylinder of the sleeve to make both ends of the bamboo splits be located between two adjacent shifting rods on the two shifting forks. At the moment, the conveying power device can stop operating, the bamboo splits no longer move axially, and the clamping semi-rings loosen the bamboo splits.

After the clamping semi-rings loosen the bamboo split, the clamping semi-rings are driven by the conveying power device to move (when the clamping and conveying device is in front of the sorting device, the clamping semi-rings move forward; and when the clamping and conveying device is located between the scraping device and the sorting device, the clamping semi-rings move backwards), thus making the end parts of the bamboo splits be separated from the clamping semi-rings in an axial direction. Certainly, when the clamping and conveying device is located between the scraping device and the sorting device, in a case that an axial distance between the scraping device and the sorting device is short, the clamping semi-rings move backwards to an extreme position (the distance between the clamping semi-rings and the sorting device is the maximum), the opening distance of the clamping semi-rings in a radial direction is large, and the opening position and the opening size between the clamping semi-rings cannot prevent the bamboo splits from moving towards the transverse outlet along the clearance in a circumferential direction of the sleeve under the pushing of the shifting forks.

At the moment, as both ends of each bamboo split are located at two adjacent shifting rods on the two shifting forks, when the shifting fork driving device operates, the shifting forks can push the bamboo split to move towards the transverse outlet along the clearance in the circumferential direction of the sleeve. As the clearance t between the inner cylinder and the outer cylinder satisfies h<t<2h, the bamboo split cannot overturn in the process of moving in the circumferential direction of the sleeve, and can only be kept at a posture that the bamboo inner layer in the clearance faces the inner cylinder of the sleeve, and a situation that the bamboo inner layer of the bamboo split faces the outer cylinder is avoided. Therefore, it is guaranteed that the bamboo inner layers or the bamboo outer layers of the bamboo splits are arranged towards the same direction in sequence. Under the pushing of the shifting forks, the bamboo splits come out of the transverse outlet of the sleeve in sequence.

During the process, the purposes of splitting the raw bamboo into bamboo splits and scraping the node diaphragms of the bamboo splits as well as sorting the bamboo outer layers and the bamboo inner layers of the bamboo splits towards the same direction in sequence are achieved, the manual sorting is avoided, the automation degree is high, and the operation efficiency is high.

The shifting fork driving device is located inside the sleeve to prevent the sleeve from interfering with the axial movement and circumferential movement of the bamboo split. For example, the shifting fork driving device is arranged inside the inner cylinder and is connected to the shifting forks through an axial-extending slender shaft so as to drive the shifting forks to rotate. Certainly, the shifting fork driving device is known in the prior art and will not be described again.

As a further improvement of the node diaphragm scraping and sorting device for a bamboo split above, a plurality of elastic sheets are arranged in the clearance. In the radial direction of the sleeve, the inner ends of the elastic sheets are connected to the inner cylinder wall, while the outer ends of the elastic sheets extend towards the outer cylinder wall to form a warping shape, and the sleeve is configured to press the bamboo split in the clearance against the outer cylinder wall through the warped outer ends of the elastic sheets. In the axial direction of the sleeve, the elastic sheets are in an inclined warping state, and the inner ends close to the inner cylinder wall are behind the outer ends close to the outer cylinder wall, thus enabling the bamboo split to enter the clearance from back to front in the axial direction. In the circumferential direction of the sleeve, the sides, close to the transverse outlet of the sleeve, of the elastic sheets each are a proximal side edge, the sides, away from the transverse outlet of the sleeve, of the elastic sheets each are a distal side edge, and for the distal side edge of one elastic sheet and the proximal side edge of the other elastic sheet which are adjacent in the circumferential direction of the sleeve, the distal side edge of the elastic sheet is closer to the axis of the sleeve, such that the bamboo split can move towards the transverse outlet under the pushing of the shifting forks. At the distal side edge of the elastic sheet and the proximal side edge of the elastic sheet which are adjacent in the circumferential direction of the sleeve, the distal side edge of the elastic sheet is closer to the axis of the sleeve, and the proximal side edge of the elastic sheet is far away from the axis of the sleeve. That is, the elastic sheet close to the transverse outlet of the sleeve cannot block the transverse movement of the bamboo split, and thus the bamboo can move to the transverse outlet smoothly.

In at least one embodiment, a plurality of groups of elastic sheets are arranged in the sleeve, and the elastic sheets in each group are spirally arranged. Various groups of elastic sheets are arranged at intervals in the axial direction of the sleeve. For example, in total, there are three groups of elastic sheets, which are respectively located at the middle part and both ends of the sleeve in the axial direction.

In at least one embodiment, a plurality of groups of elastic sheets are arranged in the sleeve, and the elastic sheets in each group are annularly arranged. Various groups of elastic sheets are arranged at intervals in the axial direction of the sleeve. In total, there are three groups of elastic sheets, which are respectively located at the middle part and both ends of the sleeve in the axial direction.

The purpose of providing the elastic sheet is to press the bamboo split on the outer cylinder, such that the bamboo split can be pushed against the outer cylinder wall all the time when moving in the clearance. That is, the bamboo split is basically tangent to the outer cylinder wall to prevent the bamboo split from being in a cutting state and being mutually laminated with the outer cylinder wall, and therefore butt-joint contact is basically formed between the adjacent bamboo splits in the circumferential direction, and the bamboo splits can be pushed to move more smoothly.

However, the provided elastic sheets cannot cause obstruction when the bamboo splits enter the clearance from back to front along the axial direction of the sleeve, and therefore the inner ends of the elastic sheets connected to the inner cylinder wall should be located behind (close to the rear end of the sleeve), and the warped outer ends extending towards the outer cylinder wall should be located in front (close to the front end of the sleeve) to form an inclined state that the inner ends of the rear portions are low (close to the axis of the sleeve) and the outer ends of the front portions are high (away from the axis of the sleeve), and therefore the bamboo splits can axially enter the clearances smoothly.

In addition, the provided elastic sheets cannot cause obstruction when the bamboo splits move towards the transverse outlet of the sleeve in the clearance along the circumferential direction of the sleeve, and therefore, for the distal side edge of one elastic sheet and the proximal side edge of another elastic sheet which are adjacent in the circumferential direction of sleeve, the distal side edge is closer to the sleeve axis that the proximal side edge. That is, the proximal side edge is high (far away from the sleeve axis), and the distal side edge is low (close to the sleeve axis). In this way, in the two adjacent elastic sheets in the circumferential direction of the sleeve, the proximal side edge is above the distal side edge, the side edges of the adjacent elastic sheets in the circumferential direction in each group of elastic sheets are in a laminated state, such that the bamboo splits can move in the circumferential direction of the sleeve in the clearance, and the bamboo splits can smoothly move towards the direction of the transverse outlet as there is no obstruction from the previous elastic sheet to the next elastic sheet.

The plurality of groups of elastic sheets arranged at intervals in the axial direction of the sleeve can press the bamboo splits warping and bending upwards in a length direction (some bamboo splits are far away from the axis and some are close to the axis in different axial positions) on the outer cylinder wall integrally to prevent the bamboo splits from warping and bending, such that the bamboo splits are in a straight state and are guaranteed to move along the circumferential direction smoothly. For example, referring to FIG. 11, warped and bent bamboo splits represented by dotted lines in the figure are integrally pressed and pushed against the outer cylinder wall of the outer cylinder 42 under the action of the elastic sheets 6 in the three groups of elastic sheets 60, like the bamboo splits 101 represented by the solid lines in a straight state.

As a further improvement of the node diaphragm scraping and sorting device for a bamboo split above, the device further comprises a carrier plate which is located at the transverse outlet of the sleeve and configured to bear the bamboo split coming out of the transverse outlet, and the carrier plate is in butt joint with the side edge of the outer cylinder. The carrier plate is configured to bear the bamboo splits coming out of the transverse outlet of the sleeve, thus facilitating the subsequent operation.

In at least one embodiment, an elastic pressing plate for pressing the bamboo split coming out of the transverse outlet on the carrier plate is provided at an upper opening position at the transverse outlet of the sleeve.

In at least one embodiment, a plurality of elastic pressing plates are provided, which are arranged at intervals on the side edge of the inner cylinder at the transverse outlet of the sleeve. The device further comprises a flat plate located above the carrier plate, and a distance between the flat plate and the carrier plate is slightly greater than the thickness of the bamboo split.

To prevent a situation that the bamboo outer layers or the bamboo inner layers of the bamboo splits are not towards the same direction caused by the overturning of the bamboo splits coming out of the transverse outlet, the elastic pressing plates for pressing the bamboo splits on the carrier plate is provided. The elastic pressing plates are not only convenient for the transverse movement of the bamboo splits, but also can prevent the bamboo splits from overturning on the carrier plate.

As a further improvement of the node diaphragm scraping and sorting device for the bamboo split, the inner cylinder and the outer cylinder are both in a net shape with leakage holes. The net-shaped inner cylinder and the outer cylinder are convenient for discharging small scraps and the like generated in the machining process.

As a further improvement of the node diaphragm scraping and sorting device for the bamboo split, each shifting fork comprises three to four shifting rods uniformly distributed in the circumferential direction.

The shifting rods are not too much to prevent collision with the bamboo splits moving axially.

As a further improvement of the node diaphragm scraping and sorting device for the bamboo split, the various pressing semi-rings are staggered in the axial direction. thereby preventing the pressing semi-rings from interfering with each other when pressing the bamboo splits.

As a further improvement of the node diaphragm scraping and sorting device for the bamboo split, the periphery of the conical cylinder is provided with at least one annular groove. The annular groove can play a role of scraping the node diaphragms of the bamboo splits.

As a further improvement of the node diaphragm scraping and sorting device for the bamboo split, the pressing semi-ring is semi-circular.

As a further improvement of the node diaphragm scraping and sorting device for the bamboo split, the pressing power device is a pressing air cylinder.

As a further improvement of the node diaphragm scraping and sorting device for the bamboo split, the clamping power device is a clamping air cylinder.

As a further improvement of the node diaphragm scraping and sorting device for the bamboo split, the conveying power device is a conveying air cylinder, or a mechanical conveying power device including a motor.

As a further improvement of the node diaphragm scraping and sorting device for the bamboo split, the various clamping semi-rings are staggered in the axial direction, thereby preventing the clamping semi-rings from interfering with each other when pressing the bamboo splits.

As a further improvement of the node diaphragm scraping and sorting device for a bamboo split, the inner ring is connected to an inner ring moving power device which drives the inner ring to move along the axis. In at least one embodiment, the clamping and conveying device is located between the scraping device and the shifting fork in the sorting device, and the inner ring moving power device is arranged inside the conical cylinder in the scraping device. The inner ring moving power device is an inner ring driving oil cylinder.

The inner ring is connected to the inner ring moving power device so as to actively adjust an axial position easier instead of being passively and axially moved along with the axial movement of the clamping semi-rings under the clamping of the clamping semi-rings. When the clamping and conveying device is located between the scraping device and the shifting fork at the rear part of the sorting device, the better conveying effect of the bamboo split can be achieved, especially when the bamboo split cannot completely penetrate through the clearance of the sleeve only by means of the pushing of the impact pushing device, the clamping and conveying device can convey the bamboo split without node diaphragms in a relay mode, thus making the whole bamboo split complete the scraping of the node diaphragm smoothly and penetrate through the sleeve. The inner ring moving power device is located inside the conical cylinder to prevent the axial movement of the bamboo split from being interfered by the inner ring moving power device. For example, the inner ring moving power device inside the conical cylinder is connected to the inner ring through a slender rod to drive the inner ring to move axially. The inner ring moving power device is known in the prior art and will not be described again.

As a further improvement of the node diaphragm scraping and sorting device for a bamboo split, the clearance t between the inner cylinder and the outer cylinder is smaller than the width of the bamboo split.

BRIEF DESCRIPTION OF THE DRAWINGS

FIG. 7 is a side view of a sleeve, a shifting fork, a carrier plate, an elastic pressing plate and the like;

In the drawings:

Splitting cutter ring-1; splitting cutter-11;

scraping device-2; conical cylinder-21; scraping ring-22; annular groove-23;

pressing semi-ring-24; pressing air cylinder-25;

clamping and conveying device-3, inner ring-31, central sliding rod-32, clamping semi-ring-33, edge sliding rod-34, clamping air cylinder-35, inner ring driving oil cylinder-36, conveying power device-37;

sorting device-4; inner cylinder-41; outer cylinder-42; transverse outlet-43;

clearance-44; shifting fork-45; shifting rod-46; carrier plate-47; flat plate-48; sleeve axis-49;

Impact pushing device-5; raw bamboo-100; bamboo split-101;

Elastic sheet-6; a group of elastic sheets-60; inner end-61; outer end-62; distal side edge-63; proximal side edge-64; first elastic sheet-65; second elastic sheet-66;

Elastic pressing plate-7; torsional block-8; arc plate-9.

DETAILED DESCRIPTION OF THE EMBODIMENTS

Embodiment I

Figure 1:
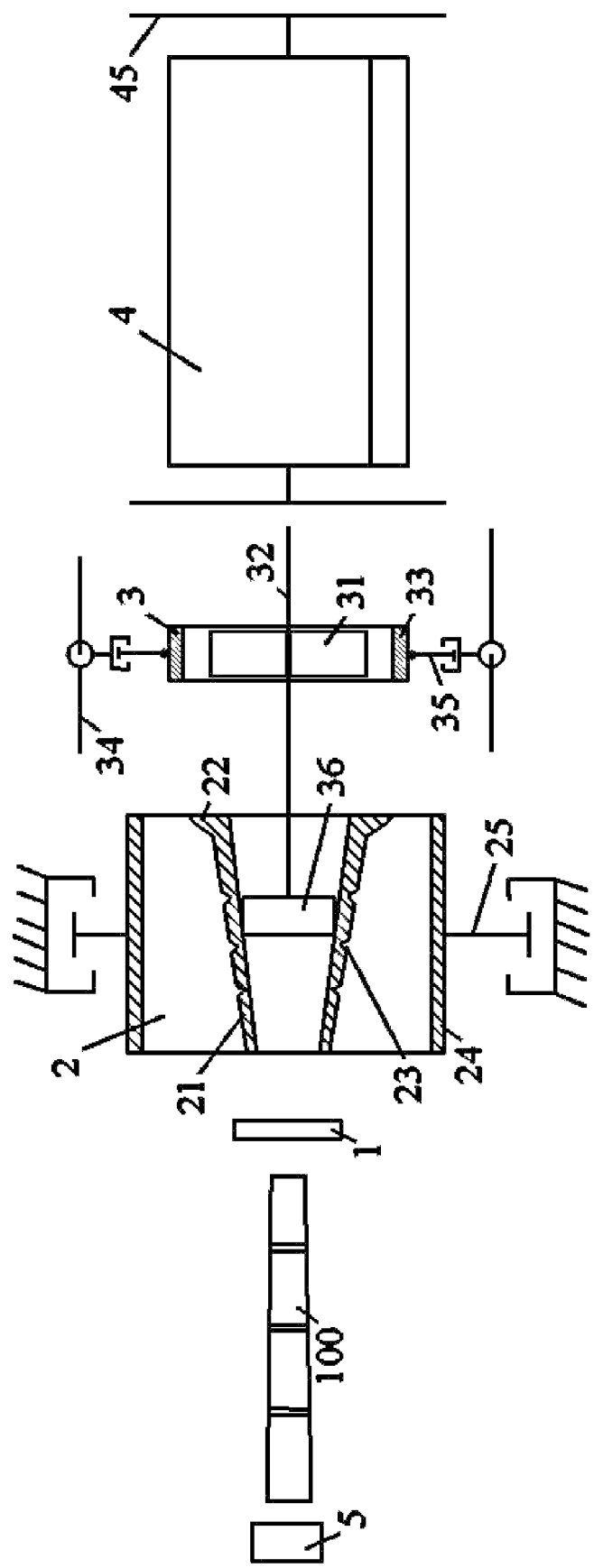
FIG. 1 is a schematic diagram of a node diaphragm scraping and sorting device for a bamboo split in accordance with an embodiment I.
Figure 2:
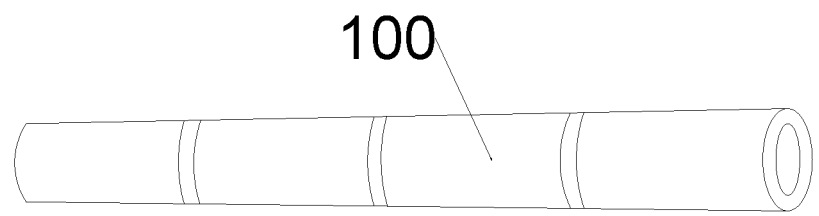
FIG. 2 is a three-dimensional diagram of a raw bamboo.

Referring to a node diaphragm scraping and sorting device for a bamboo split shown in FIG. 1, which comprises a sorting device 4, a clamping and conveying device 3, a scraping device 2, a splitting cutter ring 1, and an impact pushing device 5 arranged front to back along the axis in sequence.

The impact pushing device 5, such as a pushing oil cylinder known in the prior art, is configured to push raw bamboo having a small front part and a big rear part forwards along the axis.

Figure 3:
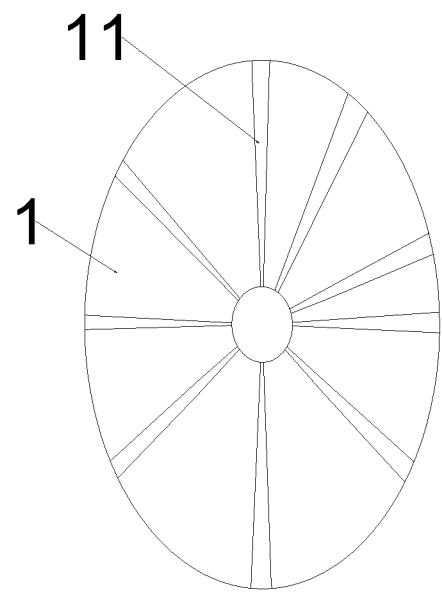
FIG. 3 is a three-dimensional diagram of a splitting cutter ring.

The splitting cutter ring 1 in FIG. 3 is provided with a plurality of splitting cutters 11 arranged in a circumferential direction, as is known in the prior art, and is configured to split the raw bamboo 100 pushed by the impact pushing device into bamboo splits 101 having equal widths in a circumferential direction.

Figure 4:
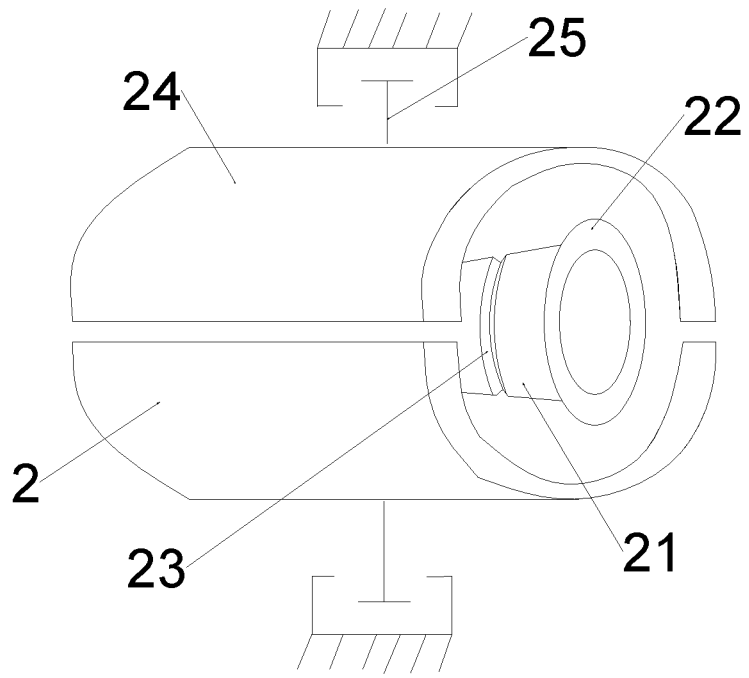
FIG. 4 is a three-dimensional diagram of a scraping device.

In the scraping device 2 as shown in FIGS. 1 and 4, a scraping ring 22 is arranged on the periphery of the large end of the conical cylinder 21 with the small rear part and the large front part; and a plurality of annular grooves 23 are formed in the periphery of the conical cylinder. At least two pressing semi-rings 24 are arranged in a circumferential direction of the conical cylinder and are connected to a pressing power device (i.e., a pressing air cylinder 25) which drives the pressing semi-rings to move in a radial direction of the conical cylinder.

Figure 5:
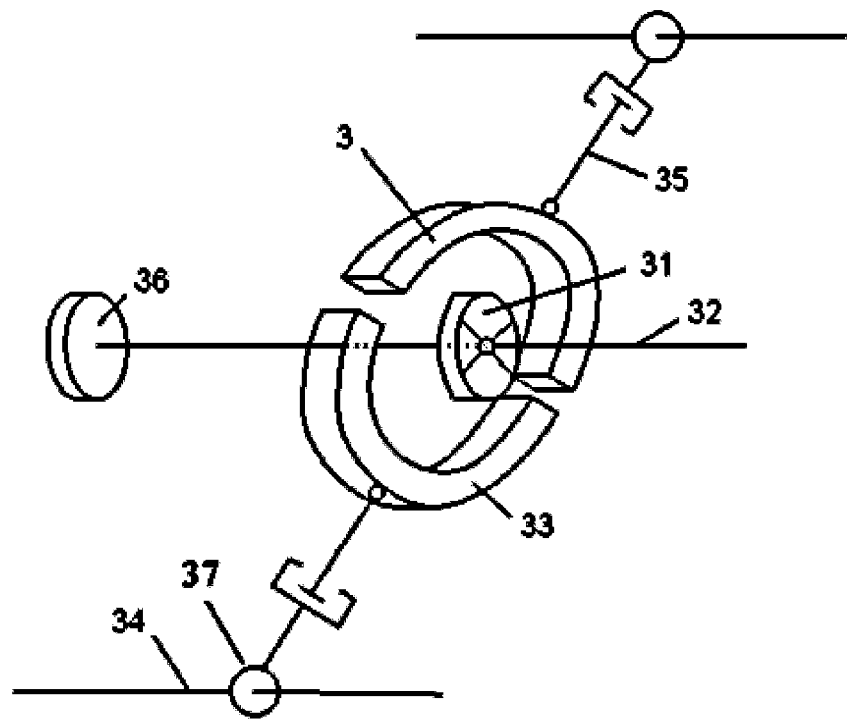
FIG. 5 is a three-dimensional diagram of a clamping and conveying device.
Figure 6:
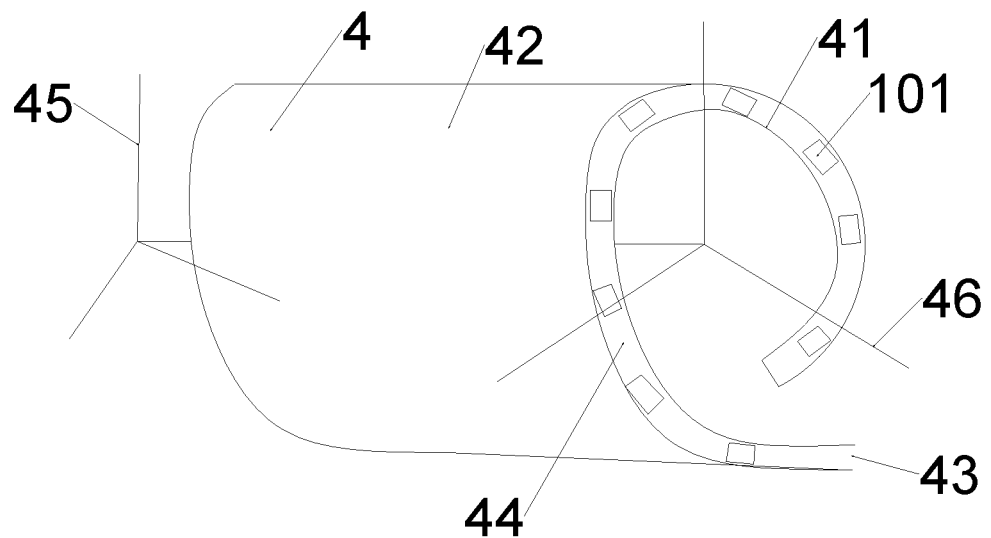
FIG. 6 is a three-dimensional diagram of a sleeve and shifting forks.
Figure 7:
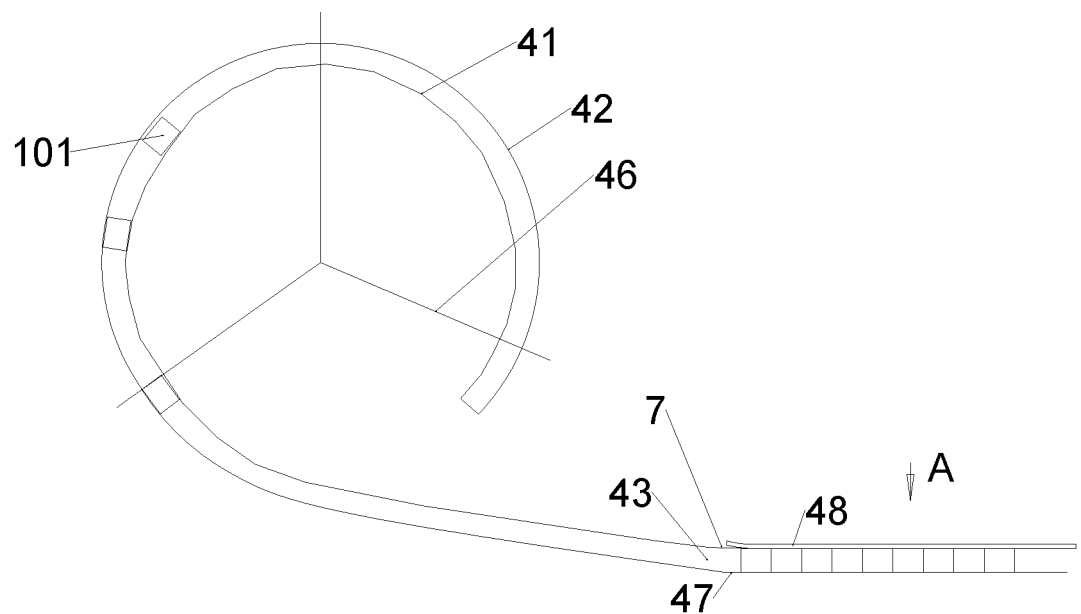
Figure 8:
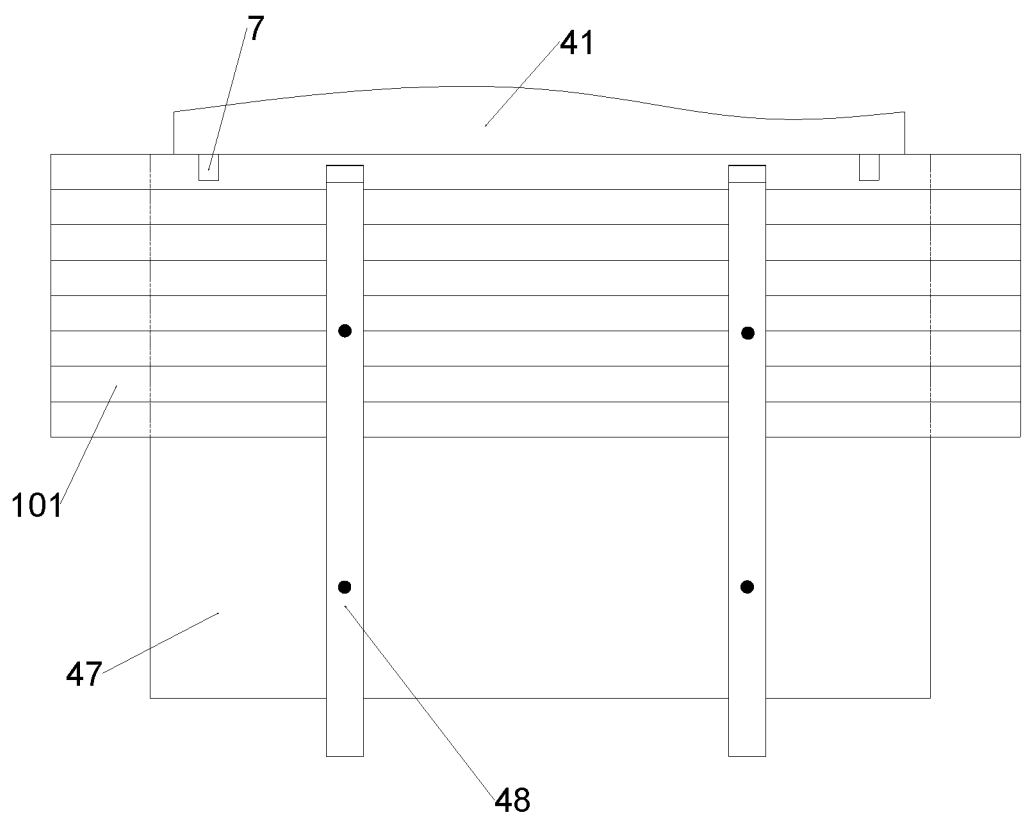
FIG. 8 is A-directional view of a carrier plate, an elastic pressing plate and the like in FIG. 7.
Figure 9:
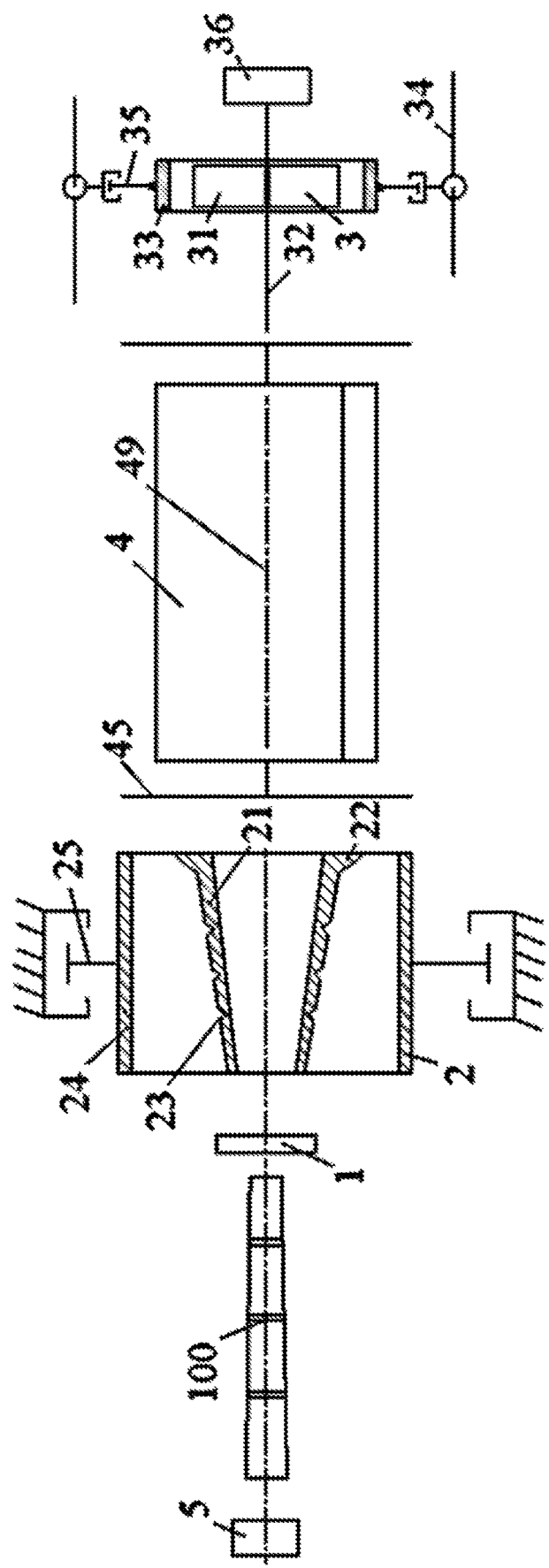
FIG. 9 is a schematic diagram of a node diaphragm scraping and sorting device for a bamboo split in accordance with an embodiment II.
Figure 10:
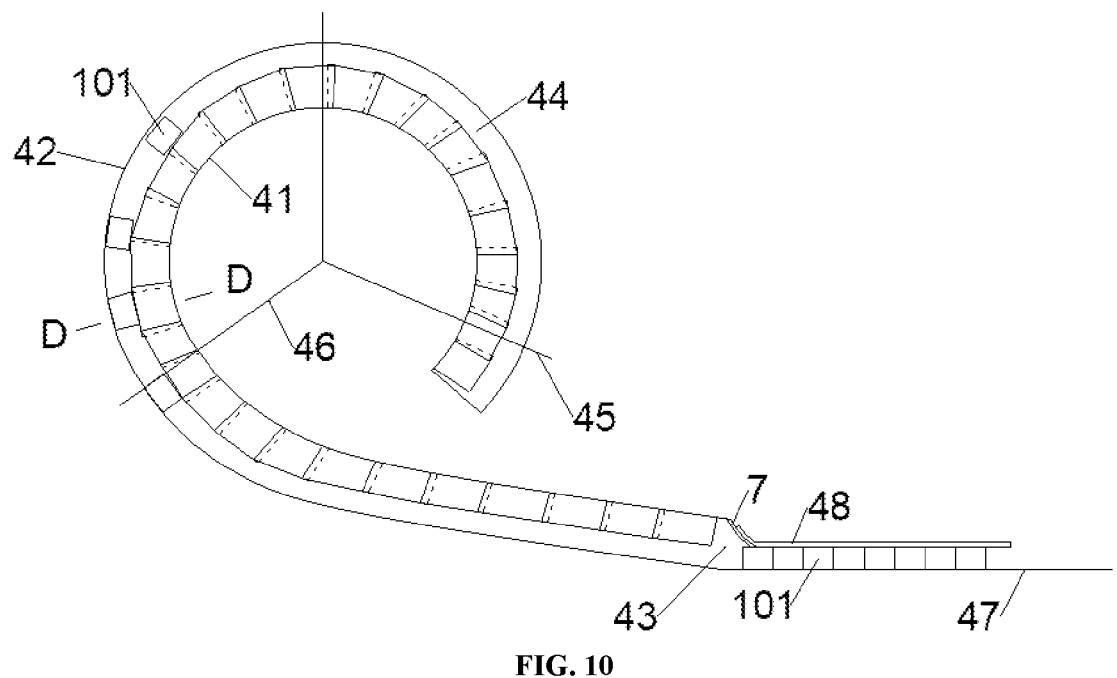
FIG. 10 is a side view of a sleeve, a shifting fork, an elastic sheet, a carrier plate, an elastic pressing plate and the like in accordance with an embodiment II.
Figure 11:
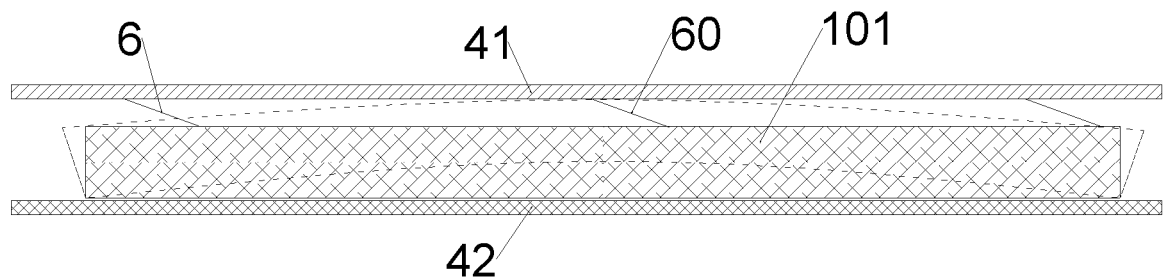
FIG. 11 is a sectional view of D-D in FIG. 10.

The clamping and conveying device 3 as shown in FIGS. 1 and 5 is configured to clamp a bamboo split in a radial direction and to convey the bamboo split in an axial direction. In the clamping and conveying device 3, an inner ring 31 is slidingly arranged on a central sliding rod 32 extending along the axis, and the inner ring 31 is connected to an inner ring moving power device (i.e., an inner ring driving oil cylinder 36) which drives the inner ring to move along the central sliding rod 32. The inner ring driving oil cylinder is arranged inside the conical cylinder 21.

At least two clamping semi-rings 33 are arranged in a circumferential direction of the inner ring 31, and the clamping semi-rings 33 are connected to a clamping power device (i.e., a clamping air cylinder 35) which drives the clamping semi-rings to move in a radial direction of the inner ring. The clamping air cylinder 35 is slidingly arranged on an edge sliding rod 34 extending parallel to the axis, and the clamping air cylinder 35 is connected to a conveying power device 37 which drives the clamping air cylinder 35 to slide along the edge sliding rod 34. The conveying power device 37 is a conveying oil cylinder, or a mechanical conveying power device including a motor.

The sorting device 4 as shown in FIGS. 1 and 6-8 mainly comprises a sleeve, and two shifting forks located at both ends of the sleeve. The sleeve is e-shaped and is provided with an inner cylinder 41 and an outer cylinder 42 to form a double-layer structure. A height t of a clearance 44 (a distance in a radial direction of the sleeve) between the inner cylinder and the outer cylinder satisfies: $h<t<2h$, and h is the average thickness of the bamboo split. A transverse outlet 43 is formed between the side edge of the inner cylinder and the side edge of the outer cylinder which are away from the axis.

Each shifting fork 45 comprises three shifting rods 46 which are uniformly distributed in a circumferential direction of the sleeve and extend along a radial direction of the sleeve. Two shifting forks are connected to a shifting fork driving device which drives the shifting forks to rotate around the axis and located inside the inner cylinder of the sleeve. A carrier plate 47 is located at the transverse outlet of the sleeve and configured to bear the bamboo split coming out of the transverse outlet, and the carrier plate 47 is in butt joint with the side edge of the outer cylinder at the transverse outlet of the sleeve. One end of each of two flat plates 48 is close to the side edge of the inner cylinder close to the transverse outlet of the sleeve, and a distance between the flat plate 48 and the carrier plate 47 is slightly greater than the thickness of the bamboo split.

When the bamboo split penetrates through the clearance between the inner cylinder and the outer cylinder in an axial direction, both ends of the bamboo split are located between two adjacent shifting rods of two shifting forks, the shifting forks are rotated to push the bamboo split to move towards the transverse outlet along the clearance in the circumferential direction of the sleeve and to come out of the transverse outlet to the carrier plate 47.

During the use of the device in accordance with the embodiment I, the raw bamboo with the small-head end in front and the large-head end in rear axially moves from the back to the front in an axial direction under the action of the impact pushing device, and the raw bamboo is gradually split by the splitting cutter ring from the small-head end thereof, thus splitting the raw bamboo in the circumferential direction to form bamboo splits.

When the annularly arranged bamboo splits pass through the position between the conical cylinder and the pressing semi-rings, the pressing semi-rings, under the driving of the pressing power device, can press the bamboo splits on the scraping ring, and the scraping ring is configured to scrape the node diaphragms on the bamboo splits.

When the annularly arranged bamboo splits continue to move forwards under the action of the impact pushing device, the front parts of the bamboo splits extend to the position between the inner ring and the clamping semi-rings and then enter the clearance of the e-shaped sleeve. After the bamboo splits lose the power of the impact pushing device, the clamping semi-rings, under the driving of the clamping power device, can clamp the bamboo splits between the inner ring and the clamping semi-rings.

The conveying power device 37 operates to drive the bamboo splits to move axially, such that the whole raw bamboo is completely split into annularly arranged bamboo splits by the splitting cutter ring, the node diaphragms on the bamboo splits are scraped through the scraping of the scraping ring, and then the bamboo splits enter the clearance in the e-shaped sleeve until the rear ends of the bamboo splits come out of the scraping device. When both ends of the bamboo splits are located between two adjacent shifting rods on the two shifting forks, the conveying power device 37 can stop operating, the bamboo splits no longer move axially, and the clamping semi-rings loosen the bamboo splits; afterwards, the clamping semi-rings are driven by the conveying power device 37 to move to make the rear ends of the bamboo splits separate from the clamping semi-rings in the axial direction. When the shifting fork driving device operates, the shifting forks push the bamboo splits to move towards the transverse outlet along the clearance in the circumferential direction of the sleeve. As the height t of the clearance satisfies $h<t<2h$ and is smaller than the width of the bamboo split, the bamboo split cannot overturn in the process of moving in the circumferential direction and is only kept at posture that the bamboo inner layer in the clearance faces the inner cylinder of the sleeve, and a situation that the bamboo inner layer of the bamboo split faces the outer cylinder is avoided. Therefore, it is guaranteed that the bamboo inner layers or the bamboo outer layers of the bamboo splits are arranged towards the same direction in sequence. Under the pushing of the shifting forks, the bamboo splits come out of the transverse outlet of the sleeve in sequence to enter the position between the carrier plate and the flat plate.

Embodiment II

The main difference between a node diaphragm scraping and sorting device for a bamboo split of the embodiment II, which is shown in FIGS. 9-14, and the node diaphragm scraping and sorting device for the bamboo split of the embodiment I is the sorting device.

Compared with the sorting device in the embodiment I, the sorting device 4 in FIG. 4 in the embodiment II is additionally provided with an elastic sheet 6 and an elastic pressing plate 7. Certainly, due to the fact that the elastic sheet 6 is arranged in the clearance between the inner cylinder and the outer cylinder in the embodiment II, the height of the clearance 44 between the inner cylinder and the outer cylinder in the embodiment II may be greater than that in the embodiment I, as long as a distance j (the distance in the radial direction of the sleeve) between the outer end 62, used for pressing the bamboo split, of the elastic sheet 6 in a free state and an outer cylinder wall satisfies: $0.5h0.7h$, and h is the average thickness of the bamboo split. Therefore, after the bamboo split enters the clearance 44, the bamboo split 101 is pressed and pushed against the outer cylinder wall by the elastic sheet 6 and cannot overturn. At this time, there is no special requirements for the height t of the clearance 44 between the inner cylinder and the outer cylinder, t≥2h.

The following description and FIGS. 9-14 will describe and illustrate different points in detail.

A plurality of elastic pressing plates 7 for pressing bamboo splits coming out of the transverse outlet on the carrier plate are arranged at intervals on the side edge of the inner cylinder at the transverse outlet 43 of the sleeve.

There are three groups of elastic sheets 6 in the clearance 44, each group of elastic sheets is spirally arranged, and the three groups of elastic sheets are respectively located at the middle part and both ends of the sleeve in an axial direction.

Figure 12:
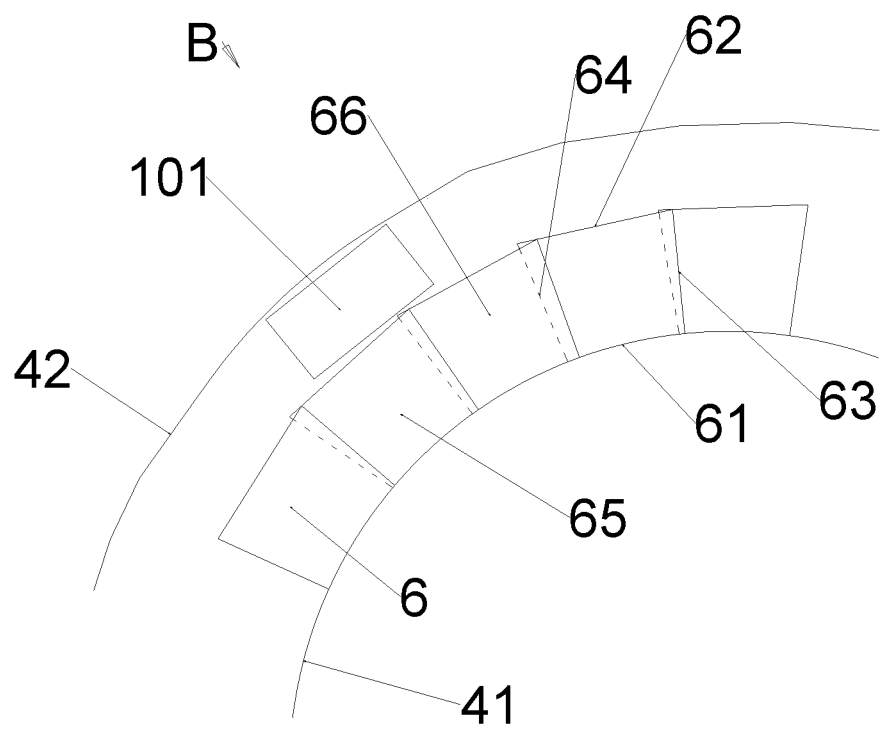
FIG. 12 is an enlarged view of a sleeve, an elastic pressing plate and the like in FIG. 10.
Figure 13:
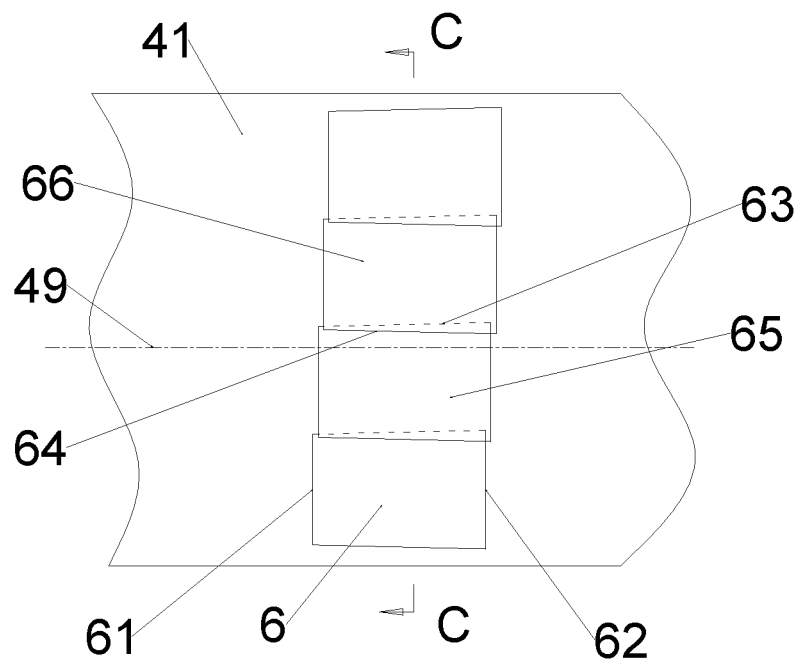
FIG. 13 is B-directional plane development (rotating) of an inner cylinder and an elastic sheet of FIG. 12.
Figure 14:
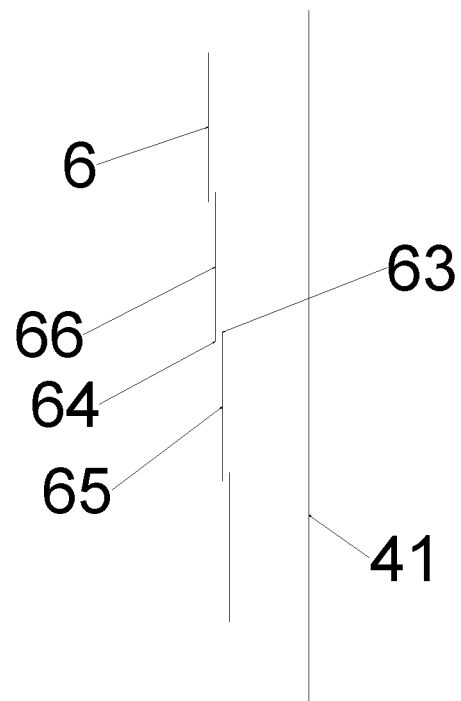
FIG. 14 is a sectional view of C-C in FIG. 13.
Figure 15:
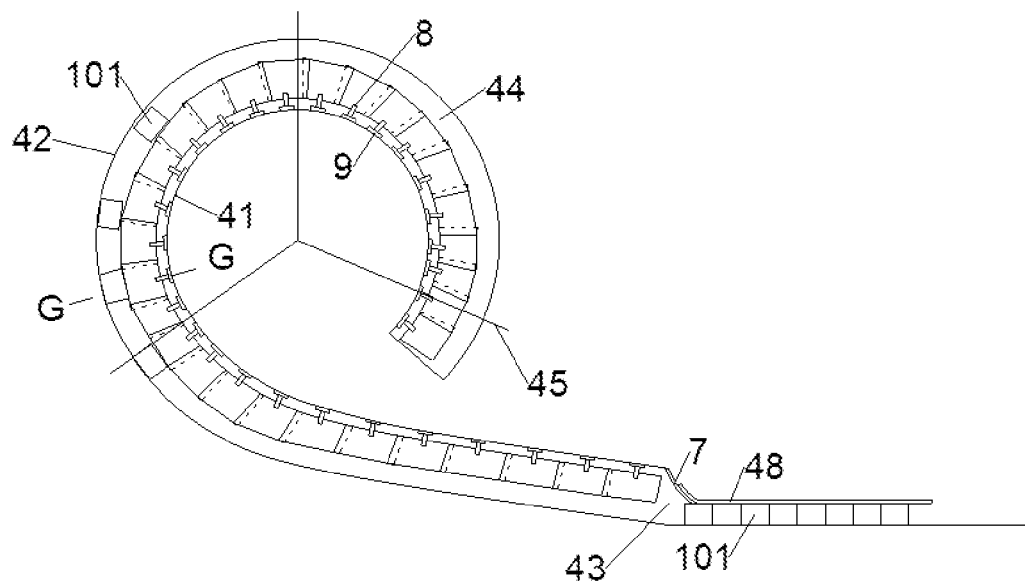
FIG. 15 is a side view of a sleeve, a shifting fork, an elastic sheet, a carrier plate, an elastic pressing plate, a torsional block, an arc plate and the like in accordance with an embodiment III.

In a radial direction of the sleeve as shown, for example, in FIGS. 12-14, the inner ends 61 of the elastic sheets 6 are connected to the inner cylinder wall, while the outer ends 62 of the elastic sheets are warped to extend towards the outer cylinder wall, and the sleeve is configured to press the bamboo split 101 in the clearance against the outer cylinder wall of the outer cylinder 62 through the outer ends 62 of the elastic sheets. In an axial direction of the sleeve, the inner ends 61 of the elastic sheets are behind the outer ends 62, thus enabling the bamboo split to enter the clearance from back to front in the axial direction. In a circumferential direction of the sleeve, the sides, close to the transverse outlet of the sleeve, of the elastic sheets each are a proximal side edge 64, the sides, away from the transverse outlet of the sleeve, of the elastic sheets each are a distal side edge 63. For the two adjacent elastic sheets in the circumferential direction of the sleeve, the distal side edge 63 of the first elastic sheet 65 is closer to the axis 49 of the sleeve than the proximal side edge 64 of the second elastic sheet 66. That is, in the two adjacent elastic sheets in the circumferential direction of the sleeve, the proximal side edge is above the distal side edge, the adjacent elastic sheets in each group of elastic sheets are in a laminated state, such that the bamboo split can smoothly move towards a transverse outlet direction along the circumferential direction of the sleeve in the clearance, and the bamboo split can move smoothly towards the transverse outlet under the pushing of the shifting forks.

During the use of the device of the embodiment II, as a distance j (the distance in the radial direction of the sleeve) between the outer end 62, used for pressing the bamboo split, of the elastic sheet 6 in a free state and the outer cylinder wall satisfies: 0.5h0.7h, after the bamboo split 101 enters the clearance 44, the bamboo split 101 is pressed and pushed against the outer cylinder wall by the elastic sheet 6 and cannot overturn, and is only kept at a posture that the bamboo inner layer in the clearance faces the inner cylinder of the sleeve, and a situation that the bamboo inner layer of the bamboo split faces the outer cylinder is avoided. Therefore, it is guaranteed that the bamboo inner layers or the bamboo outer layers of the bamboo splits are arranged towards the same direction in sequence.

Embodiment III

As shown in FIGS. 15-19, the main difference between the embodiment III and the embodiment II is that the shape of the elastic sheet, its specific connection structure to the inner cylinder, and the arrangement on the inner cylinder are different, as described in detail below.

Figure 16:
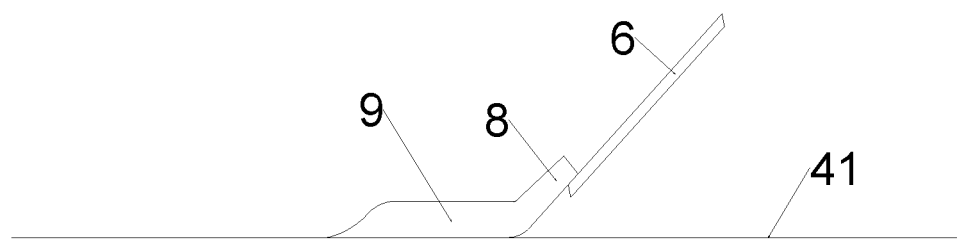
FIG. 16 is a sectional view of G-G in FIG. 15.
Figure 17:
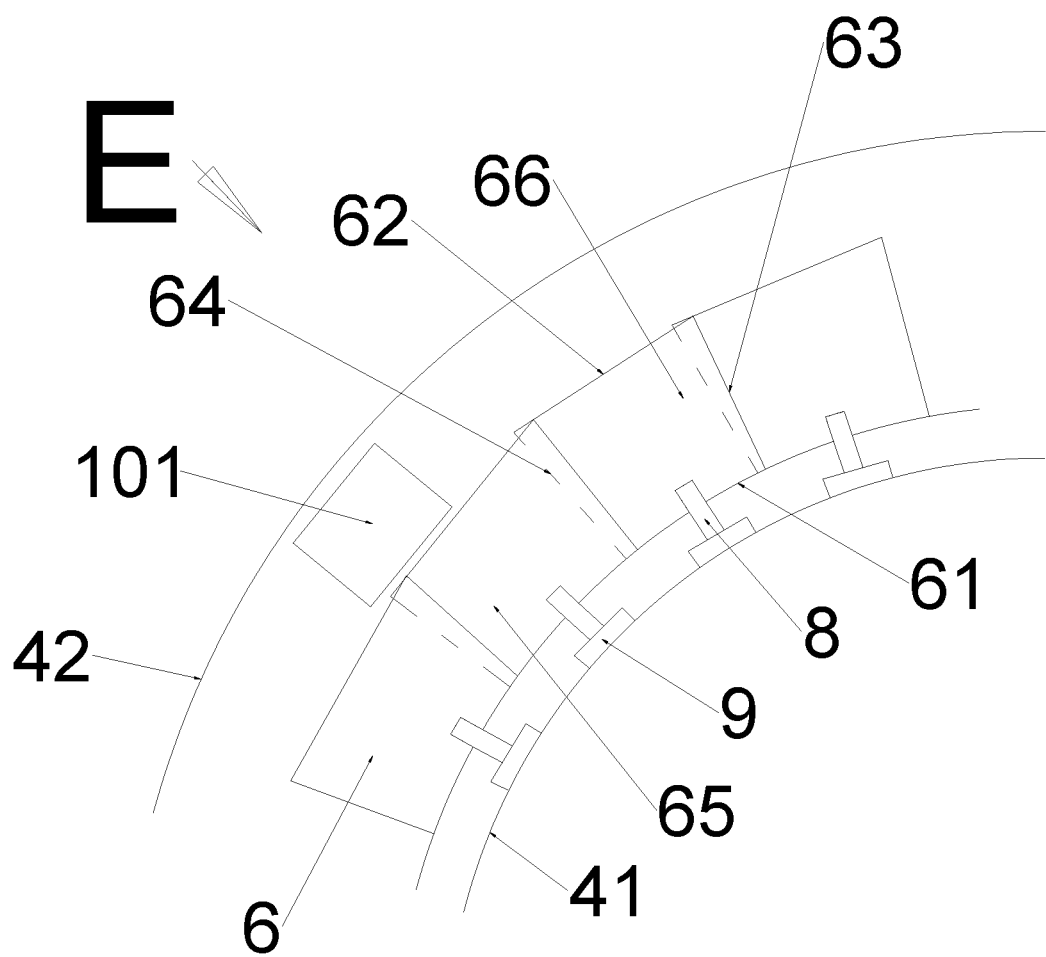
FIG. 17 is an enlarged view of a sleeve, an elastic pressing plate, a torsional block, an arc plate and the like in FIG. 15.
Figure 18:
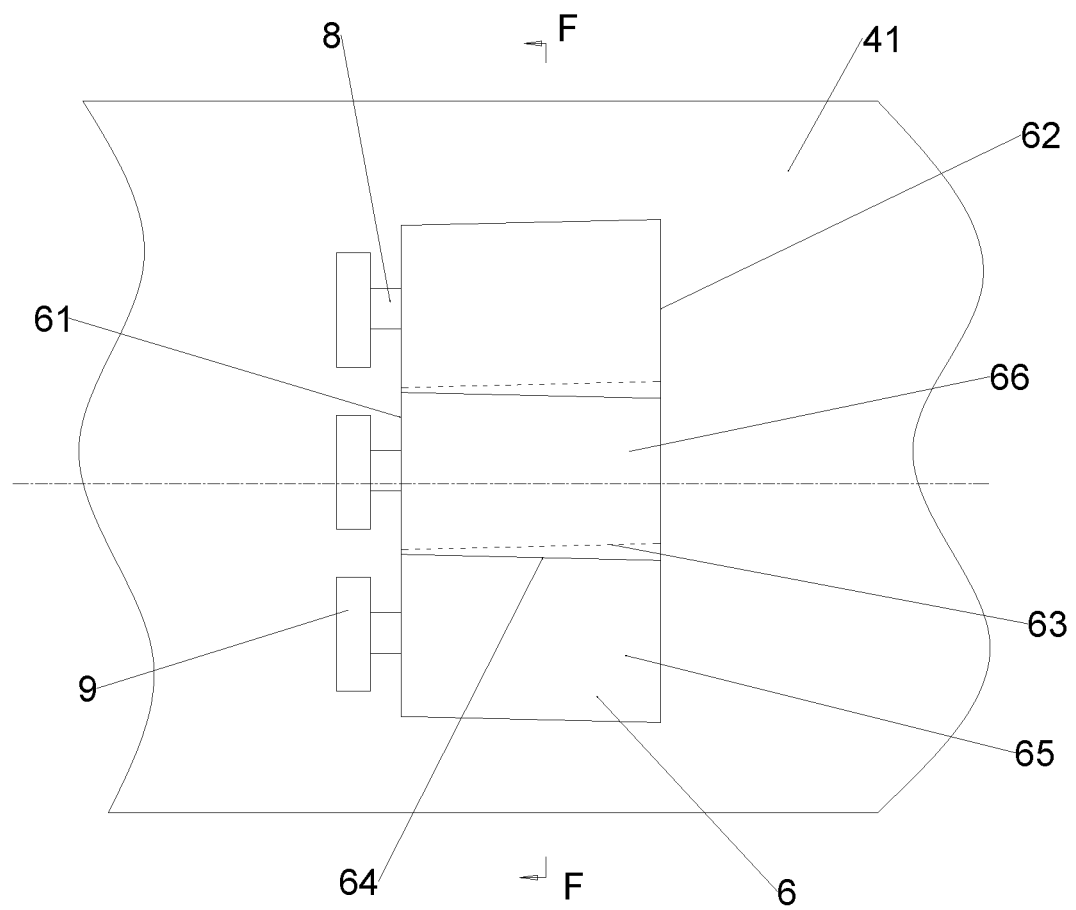
FIG. 18 is E-directional plane development (rotating) of an inner cylinder and elastic sheet of FIG. 17.
Figure 19:
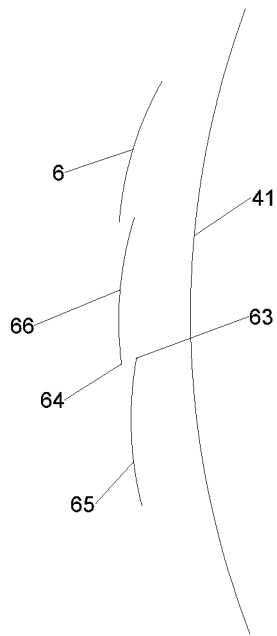
FIG. 19 is a sectional view of F-F in FIG. 18.
Figure 20:
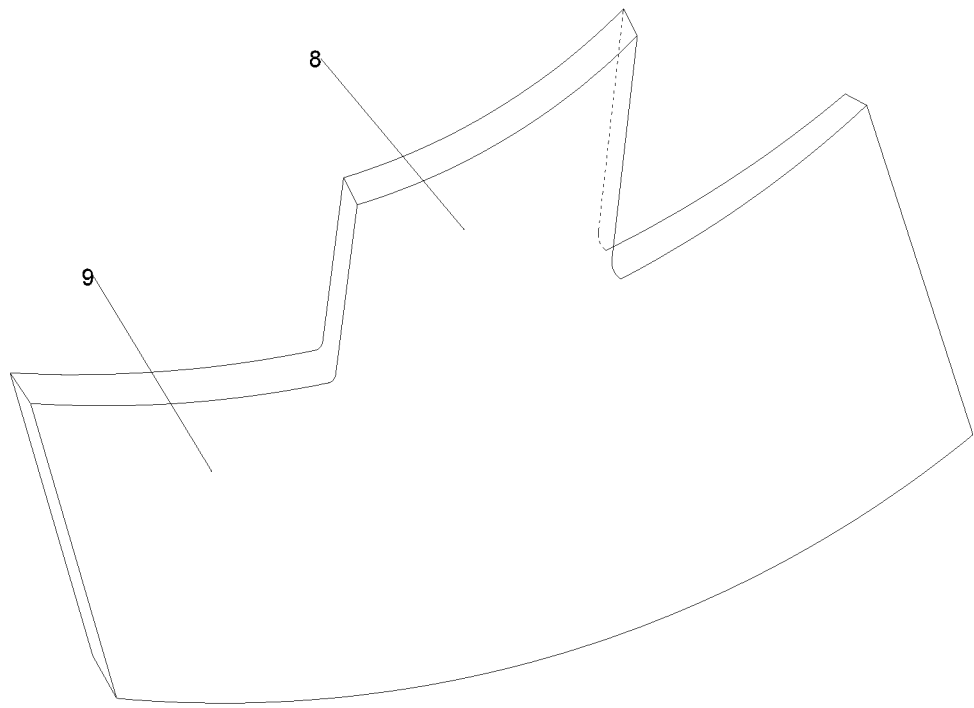
FIG. 20 is a schematic diagram of a torsional block and an arc plate.

In the radial direction of the sleeve, the inner end 61 of the elastic sheet 6 is indirectly connected to the inner cylinder wall through a torsional block 8 and an arc plate 9; the arc plate 9 is pushed against the circumferential direction of the inner cylinder 41, the rear end of the torsional block 8 is connected to the front end of the arc plate 9, and one end, close to the inner cylinder, of the torsional block 8 is connected to the inner end 61 of the elastic sheet 6 (the connecting way of the torsion block and the arc plate is as shown in FIG. 16). The front end of the torsion block 8 is far away from the inner cylinder, that is, in the axial direction of the sleeve, the torsional block 8 is in an inclined state, which will not prevent the bamboos slice from moving into the sleeve clearance from the back to the front along the axial direction of the sleeve. Meanwhile, the front end of the torsional block has a certain torsion with respect to its rear end in the circumferential direction of the inner sleeve. Referring to FIG. 20, the width of the torsional block 8 in the circumferential direction of the sleeve is smaller than that of both arc plate 9 and the elastic sheet 6.

In total, there are three groups of elastic sheets 6, which are respectively located at the middle part and both ends of the sleeve in the axial direction. The elastic sheets in the same group as well as the torsional blocks 8 and the arc plates 9 connected to the elastic sheets in the same group are annularly arranged in the circumferential direction of the inner cylinder.

In the circumferential direction of the sleeve, the elastic sheets are basically arc; the sides, close to the transverse outlet of the sleeve, of the elastic sheets each are a proximal side edge 64, and the sides, away from the transverse outlet of the sleeve, of the elastic sheets each are a distal side edge 63. For the two adjacent elastic sheets in the circumferential direction of the sleeve, the distal side edge 63 of the first elastic sheet 65 is closer to the axis 49 of the sleeve than the proximal side edge 64 of the second elastic sheet 66, that is, in the two adjacent elastic sheets in the circumferential direction of the sleeve, the proximal side edge is above the distal side edge, the adjacent elastic sheets in the circumferential direction in each group of elastic sheets are in a laminated state, and therefore the bamboo split can move smoothly towards the transverse outlet along the circumferential direction of the sleeve in the clearance. Under the pushing of the shifting forks, the bamboo split can move to the transverse outlet of the sleeve.

The present disclosure has the beneficial effects:

The present disclosure is to design a set of equipment capable of arranging the bamboo outer layers and the bamboo inner layers of bamboo splits in sequence after splitting raw bamboo into bamboo splits.

The traditional bamboo split machining sequence is as follows: taking raw bamboo; splitting, by a splitting machine, the raw bamboo into bamboo splits (also known as sawing open); and feeding the bamboo splits into a planer to remove bamboo outer layer and bamboo inner layer to form bamboo strip products.

The bamboo split machining sequence in accordance with the present disclosure is as follows: splitting raw bamboo into bamboo splits by a splitting cutter ring; scraping bamboo node diaphragm on the bamboo inner wall surfaces of the annularly arranged bamboo splits (in the splitting process) by a scraping ring on a conical cylinder under the condition that the positions and states of the annularly arranged bamboo splits are kept unchanged; enabling the machined bamboo splits to enter a clearance of a double-layer e-shaped sleeve in the same state to be arranged well: the bamboo splits are further completely pulled out from the conical cylinder by a clamping and conveying device, such that the bamboo splits can enter the position in the clearance of the double-layer e-shaped sleeves in the same state, the lengths, extending out of the double-layer e-shaped sleeve, of both ends of the bamboo splits are kept basically equal, and the bamboo splits in the clearance of the e-shaped sleeve are shifted by shifting forks (FIG. 6) to move to a transverse outlet end of the e-shaped sleeve; and under the action of the elastic pressing plates at the transverse outlet end, the bamboo splits are orderly arranged to enter the next procedure or be stored.

In accordance with the present disclosure, the conical cylinder can be arranged behind the splitting cutter ring of the splitting machine (slicing machine) for raw bamboo, the small end of the central axis of the conical cylinder and the central axis of the splitting cutter ring are kept at the same straight line. Because the bamboo splits obtained by splitting the raw bamboo using the splitting cutter ring is in a conical opening state, the diameter of the outer wall of the small end of the conical cylinder is about 10 cm larger than the outer diameter of the inner ring of the splitting cutter so as to guarantee that the bamboo splits obtained by splitting the raw bamboo can reach the outer wall of the conical cylinder smoothly. The outer periphery of the large end of the conical cylinder is provided with an annular protruded scraping ring, the outer side of the annular protruded scraping ring is provided with two opposite pressing semi-rings capable of conducting a close motion, and the two opposite pressing semi-rings capable of conducting the close motion simultaneously are connected to one pressing air cylinder, respectively, and the movable pressing semi-rings can be opened or closed simultaneously under the control of the two pressing air cylinders. In general, the pressing semi-rings are kept in an open state, when there is a bamboo split passing through the periphery of the conical cylinder, the pressing air cylinders push the two movable semi-rings to close so as to press the bamboo split on the conical cylinder; and when the bamboo split passes through the protruded scraping ring on the outer wall of the conical cylinder, the bamboo node diaphragms on the bamboo inner layer are scraped off.

The large end of the conical cylinder is opposite to one end of the double-layer e-shaped sleeve, and the central axes of the conical cylinder and the double-layer e-shaped sleeve are kept at the same straight line. The double-layer e-shaped sleeve is provided to convert the longitudinal (axial) conveying of the bamboo split into transverse conveying (circumferential direction), that is, the bamboo splits are arranged in a uniform direction of the bamboo outer layers or the bamboo inner layers. The double-layer e-shaped sleeve is of a net-shaped structure to facilitate the discharge of the machining scraps. The bottom of the side part in the circumferential direction of the e-shaped sleeve is opened so as to form a transverse outlet of the sleeve, thus facilitating the bamboo split to be discharged from the transverse outlet of the sleeve at the bottom of the e-shaped sleeve. For the embodiment I, a spacing distance (the height t of a clearance) between the inner cylinder and the outer cylinder of the double-layer sleeve is, for example, 12 mm to 15 mm in general, which is greater than the thickness h (h is, for example, 5 mm to 10 mm in general) of the bamboo split without node diaphragms, and is smaller than the width (the width of the bamboo split is, for example, 20 mm to 24 mm in general) of the bamboo split, and a clearance layer between the inner cylinder and the outer cylinder of the double-layer sleeve is a path for conveying the bamboo split. The outer diameter of inner cylinder is basically consistent with that of the scraping ring, such that the bamboo splits are annularly arranged under the pressing of pressing air cylinders and the guiding of the conical cylinder and can smoothly enter the clearance layer of the double-layer sleeve, and the size of the clearance between the inner cylinder and the outer cylinder of the e-shaped double-layer sleeve can ensure that the bamboo splits can smoothly move laterally in clearance without rolling over.

The clamping and conveying device can be arranged at the front end of the double-layer sleeve. When the front end of the bamboo split comes out of the front end of the double-layer sleeve and enters the clamping and conveying device, and after losing the impact thrust, the bamboo split is firstly clamped and then pulled by the clamping semi-rings to walk for a certain distance in the axial direction so as to be completely separated from the conical cylinder. The clamping and conveying device is composed of a clamping mechanism and a conveying mechanism. The clamping mechanism is composed of an inner ring, and two clamping semi-rings and two clamping air cylinders, wherein the two clamping semi-rings and the two clamping air cylinders can conduct a clamping motion. Each clamping semi-ring is correspondingly connected to one clamping air cylinder, and under the pressure of the clamping air cylinders, the two clamping semi-rings can push the bamboo split to be tightly pressed against the inner ring, such that the bamboo split can be clamped. The horizontal movement of the inner ring and the clamping device is completed by the conveying mechanism. The conveying mechanism is composed of three horizontal tracks (a central sliding rod and two edge sliding rods), and a conveying power device. The movable inner ring is fixed to the central sliding rod, and the clamping air cylinders are arranged on two different edge sliding rods, respectively. Under the action of the conveying power device, the clamping mechanism and the inner ring are driven to jointly move horizontally along the sliding rods. The raw bamboo is split into bamboo splits when passing through the splitting cutter ring under the impact force action of the impact pushing device, the bamboo splits can pass through the splitting cutter ring but cannot pass through the conical cylinder in full length generally. Due to the fact that the bamboo splits are subjected to the thrust action of the impact pushing device, and the thrust stops after reaching the splitting cutter ring, even if the raw bamboo has backward inertia force, the bamboo splits also cannot pass through the conical cylinder in the full length, and therefore after the bamboo splits lose the thrust and inertia, the clamping and conveying device is required to pull the bamboo splits out of the conical cylinder. The bamboo splits that have not completely passed through the conical cylinder completely are pulled away from the large end of the conical cylinder by the clamping and conveying device.

The bamboo split penetrates through the sleeve, at this time, both ends of the bamboo split are exposed outside the sleeve, and the middle part of the bamboo split is inside the clearance of the e-shaped double-layer sleeve.

Both ends of the double-layer sleeve are provided with shifting forks, and each shifting fork is composed of three to four shifting rods. The two shifting forks may be connected to one shaft and are driven by a shifting driving device, such as a motor, to rotate. Each shifting rod can drive several bamboo splits to transversely (circumferentially) move along the clearance of the sleeve in the double-layer sleeve, it should be noted that a rotating direction of the shifting fork is to push the bamboo splits to move towards a transverse outlet direction of the sleeve along the lateral directions of the bamboo splits. The bamboo splits about to enter the clearance of the e-shaped double-layer sleeve are shifted to the transverse outlet of the sleeve, and due to the arrangement of the elastic sheets in the clearance of the double-layer sleeve, the bamboo splits therein cannot roll, cannot be laminated and can only be arranged side by side. Elastic pressing plates are arranged at the transverse outlet at the tail of the e-shaped sleeve, and when the bamboo splits are shifted to the elastic pressing plates by the shifting forks, the bamboo splits can be sequentially arranged in parallel under the action of the elastic pressing plates. To guarantee that the bamboo splits cannot be obstructed by the clamping and conveying device when coming out of the transverse outlet of the e-shaped sleeve, when the bamboo splits are driven by the shifting rods to move in the clearance, the clamping and conveying device such as the clamping semi-rings can move axially to make the bamboo splits be separated from the clamping and conveying device.

Due to the fact that the e-shaped double-layer sleeve is oblong and the length of the bamboo split is longer than that of the double-layer sleeve, both ends of the bamboo split will be exposed out of the double-layer sleeve, the rotary shifting forks are located at both ends of the e-shaped double-layer sleeve, the bamboo split is arranged in the clearance layer of the double-layer sleeve, when the shifting forks are rotated, several shifting rods can be driven to shift the bamboo split, and the bamboo split, under the driving of the shifting rods, can reach the transverse outlet at the tail of the sleeve. As several bamboo splits are shifted by each shifting rod, the several bamboo splits may be stacked together when transversely moving in the double-layer sleeve. Therefore, three to four shifting rods are provided to reduce the possibility that the bamboo splits are stacked together when moving transversely as well as reduce the resistance during shifting. Meanwhile, in at least one embodiment, the elastic sheets are provided in the e-shaped sleeve to press each bamboo split, the bamboo splits with different thicknesses can be pressed by the elastic sheets, such that each bamboo split is pushed against the outer cylinder wall. Even if a stacking phenomenon occurs, the stacking possibility is relatively small. In the embodiment I, it is introduced that the spacing space (the height t of clearance) between the inner cylinder and the outer cylinder is, for example, 12 mm to 15 mm and the width of a normal bamboo split is, for example, 22 mm to 24 mm, such that the bamboo split is unable to overturn in the sleeve. Due to the fact that the thicknesses of the bamboo splits produced from different raw bamboos are inconsistent, in order to adapt to a situation that the bamboo splits with different thicknesses can pass through the clearance of the e-shaped cylinder, a large clearance t needs to be set, and therefore, the bamboo splits with thin thickness have the possibility of being stacked together. However, in a case that the elastic sheets are provided in the clearance, the bamboo splits can be pressed against the outer cylinder wall by the elastic sheets, it means that the size of the clearance t is dynamically controlled, and the bamboo splits are basically unlikely to be stacked in thickness, such that the bamboo splits can be discharged from the transverse outlet of the sleeve one by one. The reason for arranging the inner cylinder and the outer cylinder of the double-layer sleeve as the net-shaped structure is that the bamboo splits may collide with one another when moving transversely in the clearance layer of the sleeve, and generated burrs can fall off from the holes. The transverse outlet at the tail of the e-shaped sleeve is connected to a production conveying line, and the regularly arranged bamboo splits are conveyed to a planer by the conveying line or conveyed to storage equipment.

What is claimed is:

1. A node diaphragm scraping and sorting device comprising a scraping device, a sorting device, and a clamping and conveying device arranged between the scraping device and the sorting device, or in front of the sorting device; the scraping device and the sorting device are arranged from front to back along an axis;

the scraping device comprises a conical cylinder with rear part and a front part, the rear part is smaller than the front part, at least two pressing semi-rings are arranged in a circumferential direction of the conical cylinder and are connected to a pressing power device which drives the pressing semi-rings to move in a radial direction of the conical cylinder, and a scraping ring is arranged on a periphery of the front part of the conical cylinder;

the pressing semi-rings, under the driving of the pressing power device, are configured to press the bamboo split, which passes through a position between the conical cylinder and the pressing semi-rings, on the scraping ring;

the sorting device comprises a sleeve and two shifting forks located at ends of the sleeve; the sleeve is e-shaped and is provided with an inner cylinder and an outer cylinder to form a double-layer structure; a clearance t between the inner cylinder and the outer cylinder satisfies: h<t<2h, and h is a thickness of the bamboo split; the shifting forks each comprise a plurality of shifting rods extending in a radial direction of the sleeve; the shifting forks are configured to be driven to rotate around the axis; and a transverse outlet is formed between a side edge of the inner cylinder and a side edge of the outer cylinder which are at a distance from the axis;

after the bamboo split penetrates through the clearance between the inner cylinder and the outer cylinder in an axial direction, both ends of the bamboo split are located between two adjacent shifting rods of the shifting forks, the shifting forks are rotated to push the bamboo split to move towards the transverse outlet along the clearance in the circumferential direction of the sleeve and to come out from the transverse outlet, and the relative position of the bamboo split is kept unchanged to ensure the implementation of sorting;

the clamping and conveying device is configured to clamp the bamboo split in a radial direction and convey the bamboo split in an axial direction; the clamping and conveying device comprises an inner ring moving on the axis; at least two clamping pressing rings are arranged in a circumferential direction of the inner ring and are connected to a clamping power device which drives the clamping pressing rings to move in a radial direction of the inner ring, and the clamping power device is connected to a conveying power device which drives the clamping power device to move in the axial direction;

the clamping pressing rings, under the driving of the clamping power device, are able to clamp the bamboo split on the inner ring, and the conveying power device is configured to drive the clamping power device and to cause the clamped bamboo split and the inner ring to move in the axial direction.

2. The node diaphragm scraping and sorting device according to claim 1, wherein a plurality of elastic sheets are arranged in the clearance; in the radial direction of the sleeve, inner ends of the elastic sheets are connected to the inner cylinder wall, while outer ends of the elastic sheets extend towards the outer cylinder wall to form a warping shape, and the sleeve is configured to press the bamboo split in the clearance against the outer cylinder wall through the warped outer ends of the elastic sheets; in the axial direction of the sleeve, the elastic sheets are in an inclined warping state, and the inner ends are adjacent to the inner cylinder wall and behind the outer ends which are adjacent to the outer cylinder wall, thus enabling the bamboo split to enter the clearance from back to front in the axial direction; in the circumferential direction of the sleeve, sides of the elastic sheets that are adjacent to the transverse outlet of the sleeve are each a proximal side edge, sides of the elastic sheets that are away from the transverse outlet of the sleeve are each a distal side edge, and for the distal side edge of one of the elastic sheets and the proximal side edge of another one of the elastic sheets which are adjacent in the circumferential direction of the sleeve, the distal side edge of the one of the elastic sheets is closer to the axis of the sleeve, such that the bamboo split is able to move towards the transverse outlet under the pushing of the shifting forks; a radial distance j from the outer ends, used for pressing the bamboo split, of the elastic sheets in a free state to the outer cylinder wall satisfies $0.5h \leq j \leq 0.7h$, and h is the thickness of the bamboo split.

3. The node diaphragm scraping and sorting device according to claim 2, wherein a plurality of groups of elastic sheets are arranged in the sleeve, and the elastic sheets in each group are annularly arranged, and the plurality of groups of elastic sheets are arranged at intervals in the axial direction of the sleeve.

4. The node diaphragm scraping and sorting device according to claim 2, wherein a plurality of groups of elastic sheets are arranged in the sleeve, and the elastic sheets in each group are spirally arranged, and the plurality of groups of elastic sheets are arranged at intervals in the axial direction of the sleeve.

5. The node diaphragm scraping and sorting device according to claim 1, further comprising a carrier plate which is located at the transverse outlet of the sleeve and configured to bear the bamboo split coming out of the transverse outlet, and the carrier plate is in butt joint with the side edge of the outer cylinder; and an elastic pressing plate for pressing the bamboo split coming out of the transverse outlet on the carrier plate is arranged at an upper opening position of the transverse outlet of the sleeve.

6. The node diaphragm scraping and sorting device according to claim 1, wherein the inner ring is connected to an inner ring moving power device which drives the inner ring to move along the axis.

7. The node diaphragm scraping and sorting device according to claim 1, wherein the clamping and conveying device is located between the scraping device and the shifting fork in the sorting device, and an inner ring moving power device is arranged inside the conical cylinder in the scraping device.

8. The node diaphragm scraping and sorting device according to claim 1, wherein the clearance t between the inner cylinder and the outer cylinder is smaller than a width of the bamboo split.

* * * * *